United States Patent

[11] 3,543,964

| [72] | Inventor | Wilhelm Schlossmacher |
| | | Wilhelmshaven, Germany |
| [21] | Appl. No. | 717,476 |
| [22] | Filed | March 29, 1968 |
| [45] | Patented | Dec. 1, 1970 |
| [73] | Assignee | Emil Von Der Crone, Ludenscheid Westphalia, Germany a firm |
| [32] | Priority | April 3, 1967 |
| [33] | | Germany |
| [31] | | No. 40486 |

[54] MEASURING AND DISPENSING DEVICE FOR LIQUIDS
8 Claims, 6 Drawing Figs.

[52] U.S. Cl. .................................................. 222/41, 222/477, 222/549, 222/567
[51] Int. Cl. .................................................. B65d 5/76; B67d 5/22

[50] Field of Search ........................................... 141/322; 222/(Inquired)477, 41, 544, 549, 564, 567; 251/(Inquired), 353, 15; 137/(Inquired)

[56] References Cited
UNITED STATES PATENTS

| 3,184,211 | 5/1965 | Chapman et al. | 251/15 |
| 3,321,113 | 5/1967 | Conry | 222/477 |

Primary Examiner—Houston S. Bell, Jr.
Attorney—Erwin Salzer

ABSTRACT: A liquid premeasuring and dispensing device of the type wherein the quantity of liquid dispensed depends upon the time required for filling a measuring chamber having a fixed volume with liquid is provided with a pair of relatively movable inlet orifices of which one is oblong, substantially wedge-shaped and has a pair of converging sides. The relative position of the pair of orifices determines the time required for filling the aforementioned measuring chamber with liquid and, therefor, the quantity of liquid dispensed.

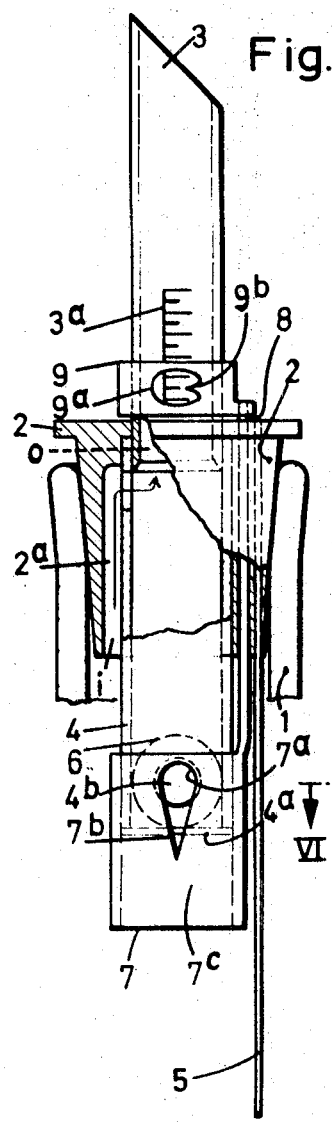
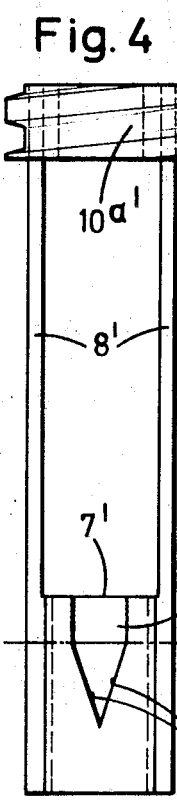
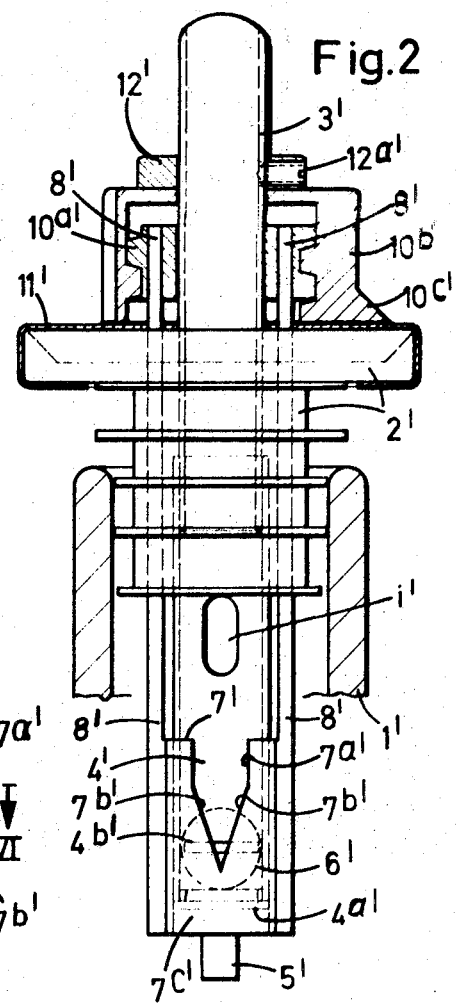
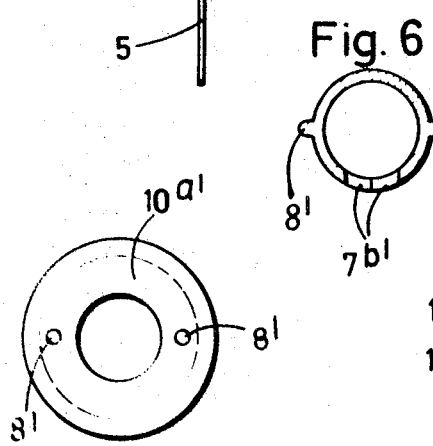
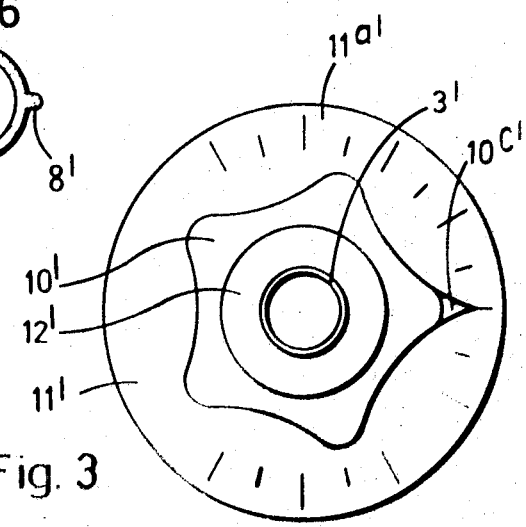

3,543,964

MEASURING AND DISPENSING DEVICE FOR LIQUIDS

BACKGROUND OF INVENTION

Devices of the kind under consideration are generally used to close bottles, and to dispense out of the bottles predetermined quantities of a beverage.

A prior art device of this description includes a container closing member which may be more or less in the shape of a bottle stopper. Air passage means project transversely through the container closing member to allow air to enter into the container when liquid is dispensed from the latter. The container closing member defines a passageway for liquid to be dispensed. This passageway has an upstream inlet and a downstream outlet. The latter is controlled by a valve element. Prior art measuring devices under consideration further include means defining a measuring chamber having a fixed internal volume. The measuring chamber houses the aforementioned valve element, and allows the same to move in the chamber between a first limit position remote from the downstream outlet of said container closing member and a second limit position adjacent said downstream outlet of said passageway defined by said container closing member. The aforementioned measuring chamber defining means include a lateral wall having an aperture for admitting liquid into the measuring chamber. A slide member having an aperture of smaller area than the aforementioned aperture is slidably mounted on the aforementioned lateral wall. This slide member has two limit positions. In one of its limit positions it has no effect upon the effective area of the aperture in the lateral wall of the measuring chamber defining means. In the other of its limit positions the smaller aperture in the slide member is arranged above the larger aperture in the lateral wall of measuring chamber defining means, thus reducing the effective area of the latter aperture. If the effective area of the latter aperture is relatively large, the time required for filling the measuring chamber and for moving the valve element to the limit position thereof precluding continued outflow of liquid is relatively short, and the quantity of liquid dispensed relatively small. On the other hand, if the effective area of the aperture in the lateral wall of the measuring chamber defining means is relatively small, the time required for filling the measuring chamber and for moving the valve element to the limit position thereof precluding continued outflow of liquid is relatively long, and the quantity of liquid dispensed relatively large.

SUMMARY OF THE INVENTION

The above prior art liquid dispensing devices are subject to the limitation that they make it possible to dispense but two specific quantities of a given liquid, i.e. a minimal quantity thereof, and a maximal quantity thereof. The device according to this invention makes it possible to dispense, in addition to a predetermined minimum quantity, and to a predetermined maximum quantity, of a liquid any desired predetermined quantity of liquid intermediate the minimum quantity and the maximum quantity. Furthermore liquid dispensing devices constructed according to this invention make it possible to adjust the volume of liquid to be measured and dispensed from the outside of a bottle or other fluid container without removing the dispensing device from the latter.

According to the present invention the slide member slidably mounted on the lateral wall of measuring chamber defining means defines an oblong, substantially wedge-shaped aperture having a pair of converging sides, and said aperture defined by said slide member is positioned to allow shifting at least in part thereof to a position of registry with an aperture defined by the lateral wall of said measuring chamber defining means to allow progressive change of the effective area of said aperture defined by said lateral wall of said measuring chamber defining means. A fluid dispensing device constructed according to this invention further includes adjustment means arranged at the outside end of a stopper or like container closing means to allow adjustment of the position of said slide member from the outside of a bottle or other container closed by the container closing means.

BRIEF DESCRIPTION OF THE DRAWINGS

FIG. 1 is in part a vertical section and in part a side elevation of a device embodying this invention placed into the neck of a bottle to close the same;

FIG. 2 is in part a vertical section and in part a side elevation of another device embodying this invention placed into the neck of a bottle to close the same;

FIG. 3 is a top plan view of the structure of FIG. 2;

FIG. 4 is a side elevation of a detail of the structure of FIG. 2;

FIG. 5 is a top plan view of the structure shown in FIG. 4; and

FIG. 6 is a section along VI-VI of FIG. 4.

DESCRIPTION OF PREFERRED EMBODIMENTS

Referring now to FIG. 1, numeral 1 has been applied to indicate the neck of a bottle closed by a stopper or container closing member in the shape of a frustum of a cone. Closing member 2 defines a passageway 2a for a liquid, or beverage, to be dispensed from a bottle of which bottle neck 1 forms a part. Passageway 2a has an inlet $i$ and an outlet $o$, and passageway 2a extends transversely through a cylindrical tubular member or measuring chamber defining means 4. The tube or air passage means 5 extends transversely through stopper or closing member 1. It is provided to admit air into the container to avoid formation of a vacuum therein when liquid is being poured out of it, or dispensed from it. Closing member or stopper 1 defines a cylindrical cavity into which the upper end of tubular member or measuring chamber defining means 4 is inserted. Reference numeral 3 has been applied to indicate a liquid dispensing tube or pouring spout arranged in coaxial relation to closing member 2 and measuring chamber defining means 4. The lower end of liquid dispensing tube or pouring spout 3 is fitted under pressure into the upper end of measuring chamber defining means 4, and thus made integral with closing member 2. The upper end of dispensing tube or pouring spout 3 is slanting and projects away from closing member 2. The measuring chamber defined by tubular member 4 is closed by a bottom 4a, and its lateral wall defines a circular aperture 4b allowing liquid to enter into the measuring chamber defined by tubular member 4. Reference character 6 has been applied to indicate a valve element normally resting on the bottom 4a of the chamber defined by tubular member 4. In the embodiment of the invention shown in FIG. 1 this valve element is in the shape of a sphere, or ball. Another shape might be given to it, but the spherical shape is preferable. Valve element 6 is movable relative to the outlet of passageway 2a and movable to an outlet obstructing position where it engages a valve seat to preclude further outflow of liquid through outlet $o$ and liquid dispensing tube or pouring spout 3. As is apparent from the above the measuring chamber defined by tubular member 4 houses valve element 6 slidably therein allowing valve element 6 to slide therein between a first limit position remote from outlet $i$ of passageway 2a to said outlet obstructing position. In the first-mentioned limit position of valve element 6 the latter rests on the bottom 4a of tubular member 4. In the outlet obstructing position valve elements 6 engages the axially inner chamfered edges of dispensing tube 3 forming a valve seat for valve element 6. A cylindrical slide member or sleeve 7 is slidably mounted on the lateral wall of measuring chamber defining tube 4. Slide member or sleeve 7 defines an oblong substantially wedge-shaped aperture 7a having a pair of converging sides 7b. Aperture 7a is positioned to allow shifting thereof at least in part to a position of registry with the aperture 4a defined by tubular member 4. Thus a shifting motion of slide member or sleeve 7 in a direction of the common axis of closing member 2, liquid dispensing tube or pouring spout 3 and measuring chamber defining tube 4 allows to effect a progressive change of the effective area of aperture 4b. When member 7 and its aperture 7a are in the lowest position thereof, the effective area of aperture 4b is virtually unrestricted. As member 7 and its aperture 7b are being moved in the direction toward closing member 2, the effective area of aperture 4b is progressively decreased. When member 7 and its aperture 7a are in a limit position closest to closing member 2, a portion 7c of the lateral wall of tubular slide member 7 covers, or obstructs, completely, the aperture 4b in the lateral wall of the measuring chamber defining means or tubular member 4. The diameter of the spherical valve element 6 is substantially equal to, but slightly less than, the internal diameter of tubular member 4. Reference numeral 9 has been applied to indicate an annular adjusting member for slide member 7 slidably mounted on liquid dispensing tube 3. Annular adjusting member 9 has a perforation 9a shaped to form a pointed 9b indicating the position of adjusting member 9 and of slide member 7 relative to liquid dispensing tube or pouring spout 3 on a scale 3a provided on the outer surface of tube or pouring spout 3. A tie rod 8 projecting transversely through closing member 2 ties adjusting member 9 mechanically to slide member 7 for joint movement of both in a direction longitudinally of liquid dispensing tube or pouring spout 3.

When the structure of FIG. 1 is tilted or reversed, liquid enters out of the bottle (not fully shown in FIG. 1) through apertures 7a and 4b into the measuring chamber defined by tube 4. While the measuring chamber is being gradually filled with liquid, liquid is also allowed to enter inlet i and to flow through passageway 2a and through outlet o into liquid dispensing tube or pouring spout 3, and out of the latter in any desired container, e.g. a glass. As the measuring chamber is being filled with liquid sphere 6 travels from bottom 4a toward orifice o. When the measuring chamber defined by tube 4 is entirely filled with liquid, sphere or valve element 6 has completed its travel along tube 4 and engages the valve seat formed by the axially inner end of liquid dispensing tube or pouring spout 3. The longer the time required for filling tube 4 with liquid, the larger the volume of liquid discharged through passageway 2a and tube 3. The time for filling tube 4 with liquid depends inter alia upon the effective area of aperture 4b. The effective area of aperture 4b can be reduced by moving adjusting member 9 and slide member 7 axially outwardly, causing the converging portion of aperture 7a to overlap aperture 4b. The smaller the effective area of aperture 4b, the longer the time required for filling the measuring chamber formed by tube 4 and to cause valve element 6 to close outlet o, the larger the quantity of liquid allowed to flow out of outlet o and dispensing tube or pouring spout 3. The desired amount of liquid to be dispensed can readily be predetermined by registering pointer 9b with a given line of scale 3a. The area or solid surface 7c of the lateral wall of measuring chamber defining means 4 completely obstructs the aperture 4b when slide member 7 is shifted to limit position thereof immediately adjacent to closing member 2. Then no liquid can enter into the measuring chamber defined by part 4, valve element 6 cannot close the outlet o, and there is no limitation to the outflow of liquid. This feature is a particularly useful one since it is sometimes desirable to render the measuring system ineffective without removing it from the bottle, or equivalent container, to which it is affixed.

In FIGS. 2—6 the same reference characters with a prime added have been applied to indicate like parts as in FIG. 1 and, therefore, FIGS. 2 to 6, inclusive, call for a detailed description of the structure shown therein only to the extent that the same differs from that shown in FIG. 1.

Referring now to FIGS. 2 to 6, bottle neck 1' is closed by closing 2' and liquid dispensing tube 3' projects away from closing member 2'. The latter is provided with an inlet i' for liquid to be poured out through dispensing tube 3'. The tubular measuring chamber defining member 4' is closed by a bottom 4a', and its lateral cylindrical wall defines a rectangular aperture 4b'. The spherical valve element 6' rests on the bottom 4a' as long as the device is in the vertical position shown in FIG. 2. Slide member 7' is slidably mounted on part 4', and provided with an incision 7a' the lower portion of which is substantially wedge-shaped and has two converging edges 7b'. Admission of air from the outside of the bottle into the bottle is effected by an air admission tube 5' of which only the lowest or axially inner portion can be seen in FIG. 2.

An annular or toroidal adjusting member 10a' for slide member 7' is slidably mounted on dispensing tube or pouring spout 3'. A pair of tie rods 8' project through a pair of passageways in closing member 2' and have lower ends affixed to slide member 7'. The adjusting member 10a' is externally screw-threaded, and its screw thread is cooperatively engaged by the internal screw thread on a rotatable adjusting member or handle 10b'. The latter is rotatable about the common axis of parts 3', 4' and 7'. Handle or adjusting member 10b' is arranged above metal cap 11' enclosing the upper end of closing member 2' and having bores for the passage of tie rods 8'. A movement of handle 10b' in a direction longitudinally of dispensing tube 3' is precluded by a disc or washer 12' held in position by a set screw 12a'. Handle 10b' is provided with a position indicator 10c' for slide member 7' extending in a direction radially outwardly from liquid-dispensing tube 3'. A fixed scale 11a' is provided on the top surface of cap 11', i.e. it is integral with closing member 2'. Fixed scale 11a' is juxtaposed to position indicator 10c', and may be calibrated in units of volume of a given liquid such as, for instance, fluid ounces of whisky.

Rotation of handle 10b' in one direction results in joint upward movement of adjusting member 10a', tie rods 8' and slide member 7' and consequent reduction of the effective area of aperture or slit 4b' arranged transversely to a longitudinal plane of symmetry of measuring chamber defining tube 4'. A reduction of the effective area of rectangular aperture or slit 4b' results in an increase of the quantity of liquid dispensed, as more fully explained in connection with FIG. 1. If handle 10' is rotated to such an extent that the solid area 7c' of slide member 4' completely obstructs aperture or slit 4b', the measuring system is rendered ineffective, i.e. any desired amount of liquid may then be dispensed with it. The dispensing device according to the present invention is particularly useful when dispensing beverages whose viscosity is relatively small because it is relatively difficult to dispense such beverages. The manual control of the outflow of beverages through an orifice may be achieved easily if the viscosity of the beverage is relatively high, and the rate of flow consequently relatively small. In such instances it may be desirable to render the measuring system inoperative and to rely on the skill of the person dispensing the beverage rather than to resort to the semiautomatic measuring action which has been described above.

It will be apparent from the foregoing that rotation of handle 10a' in such direction as to jointly lower parts 10a', 8' and 7' results in an increase of the effective area of orifice 4b', a decrease of the time required for the valve element 6' to move from bottom 4a' to its position obstructing the outflow of liquid through dispensing tube 3' and, therefore, in a reduction of the unit quantity of liquid dispensed by the device.

While there have been described what are at present considered to be preferred embodiments of this invention, it will be obvious to those skilled in the art that various changes and modifications may be made therein without departing from the invention and it is, therefore, aimed to cover all such changes and modifications as fall within the true spirit and scope of the invention.

I claim:

1. A liquid measuring and dispensing device including in combination:
   a. a container closing member having an outside end and an inside end, said closing member defining a passageway for a liquid to be dispensed, said passageway having an inlet and an outlet;
   b. air passage means projecting substantially transversely through said closing member;

c. a valve element arranged inside said closing member movable relative to said outlet of said passageway and movable to an outlet obstructing position precluding further outflow of liquid through said outlet;

d. means defining a measuring chamber housing said valve element slidably therein and allowing said valve element to slide therein between a first limit position remote from said outlet and said outlet obstructing position thereof, said measuring chamber defining means including a lateral wall defining an aperture for admitting liquid into said measuring chamber;

e. a slide member mounted on said lateral wall of said measuring chamber defining means and slidable in a direction longitudinally of said measuring chamber defining means, said slide member defining an oblong substantially wedge-shaped aperture having a pair of converging sides, and said aperture defined by said slide member being positioned to allow shifting at least in part thereof to a position of registry with said aperture defined by said lateral wall of said measuring chamber defining means to allow a progressive change of the effective area of said aperture defined by said lateral wall of said measuring chamber defining means; and f. adjustment means for said slide member arranged at said outside end of said closing member to allow adjustment of the position of said slide member from the outside of a container closed by said closing member.

2. A device as specified in claim 1 wherein said lateral wall of said measuring chamber defining means is cylindrical and wherein said slide member is a sleeve riding on said cylindrical lateral wall of said measuring chamber defining means.

3. A device as specified in claim 1 wherein said slide member includes a solid surface remote from said closing member shaped to fully obstruct said aperture in said lateral wall of said measuring chamber defining means when said slide member is shifted to a limit position thereof immediately adjacent to said closing member.

4. A device as specified in claim 1 wherein said aperture in said lateral wall of said measuring chamber defining means is in the form of a slit arranged transversely to a longitudinal plane of symmetry of said measuring chamber defining means.

5. A device as specified in claim 1 including in combination:

a. a liquid-dispensing tube projecting away from said outside end of said closing member and having a scale on the outer surface thereof;

b. an annular adjusting member for said slide member slidably mounted on said liquid dispensing tube, said annular adjusting member having a perforation shaped to form a pointer indicating on said scale of said liquid-dispensing tube the position of said annular adjusting member relative to said liquid-dispensing tube; and c. a tie rod projecting transversely through said closing member and mechanically tying said slide member to said adjusting member to cause joint movement of said slide member with said adjusting member in a direction longitudinally of said liquid-dispensing tube.

6. A device as specified in claim 1 including in combination:

a. a liquid-dispensing tube integral with and projecting away from said closing member;

b. an annular externally screw-threaded operating member for said slide member slidably mounted on said liquid-dispensing tube;

c. a pair of tie rods projecting substantially transversely through said closing member and mechanically tying said slide member to said operating member to cause joint motion of said slide member with said operating member;

d. an internally screw-threaded rotatably handle operatively related to said operating member to cause joint motion of said operating member and of said slide member in a direction longitudinally of said liquid-dispensing tube, said handle having a position indicator for said slide member extending in a direction radially outwardly from said liquid-dispensing tube; and e. fixed scale means integral with said closing member and juxtaposed to said position indicator on said handle.

7. A liquid measuring and dispensing device including in combination:

a. a container closing member having an outside end and an inside end;

b. means defining a fluid passageway from said inside end to said outside end of said closing member;

c. means for controlling the duration of periods of flow of fluid through said fluid passageway, said duration of flow periods controlling means including a movable valve body cooperating with a valve seat to selectively allow or inhibit the flow of fluid through said passageway, means defining a measuring chamber housing said valve body and having a fixed volume and variable orifice means slidable in a direction longitudinally of said fluid passageway for varying the rate of flow of fluid from a container into said measuring chamber;

d. adjusting means arranged at said outside end of said closing member for sliding said variable orifice means relative to and in a direction longitudinally of said fluid passageway defining means by an operation performed at said outside end of said closing member; and e. transmission means projecting through said closing member and movable in a direction longitudinally of said fluid passageway for transmitting motions of said adjusting means to said variable orifice means.

8. A device as specified in claim 7 including in combination:

a. a pouring spout arranged on said outside end of said closing member projecting away from said outside end of said closing member;

b. a substantially toroidal internally screw-threaded handle arranged in coaxial relation to and surrounding said pouring spout and being pivotable about the axis of said pouring spout;

c. a substantially toroidal externally screw-threaded member arranged in coaxial relation to and slidably mounted on said pouring spout and being slidable in a direction longitudinally of said pouring spout, the screw-thread of said externally screw-threaded member being in meshing engagement with the screw-thread of said internally screw-threaded handle; and d. transmission means for transmitting to said variable orifice means axial movements of said externally screw-threaded member.